(No Model.)
D. HUNT.
CASTER.
No. 594,017. Patented Nov. 23, 1897.
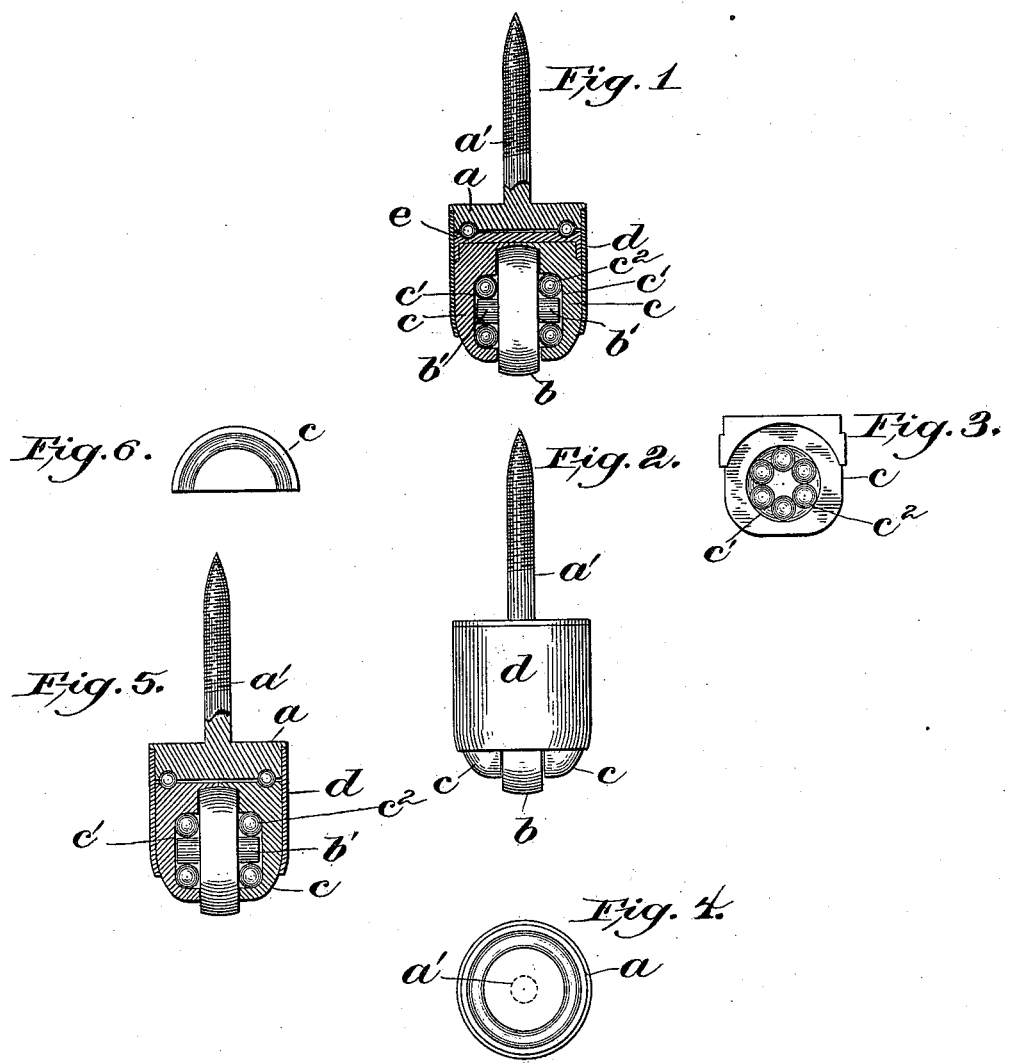
Witnesses:
Inventor:
David Hunt

UNITED STATES PATENT OFFICE.

DAVID HUNT, OF BOSTON, MASSACHUSETTS.

CASTER.

SPECIFICATION forming part of Letters Patent No. 594,017, dated November 23, 1897.

Application filed September 18, 1896. Serial No. 606,192. (No model.)

*To all whom it may concern:*

Be it known that I, DAVID HUNT, of Boston, county of Suffolk, State of Massachusetts, have invented an Improvement in Casters, of which the following description, in connection with the accompanying drawings, is a specification, like letters on the drawings representing like parts.

This invention relates to casters, and has for its object to improve the construction of the same to the end that a more cheap and durable caster may be produced and one adapted to support a heavy weight and yet work with perfect freedom.

The caster comprehending this invention comprises a roller having journals and a bearing-block therefor, a base-plate, and a ferrule for connecting said bearing-block with said base-plate in such a manner that it is securely retained in place, yet free to rotate on a vertical axis. The bearing-block may be composed of several parts—as, for instance, there may be two essential parts, one for each journal, and a cap which surmounts them and holds them together, or it may be simply two parts, one for each journal, connected together or held against separation in any desirable way. Between the adjacent faces of said base-plate and bearing-block a set of balls are preferably interposed, and these balls, in addition to affording an antifriction-bearing between the base-plate and bearing-block, serve as a key to assist in holding the parts in place. A ferrule having a more or less contracted lower end will inclose the bearing-block and will be driven onto the base-plate or otherwise connected thereto, and in case no other means are provided for holding the parts of the bearing-block together said ferrule may be made to subserve this purpose.

Figure 1 shows in vertical section a caster embodying this invention; Fig. 2, a side elevation of the caster shown in Fig. 1; Fig. 3, an inside view of one of the parts of the separable bearing-block for the roller; Fig. 4, an under side view of the base-plate of the caster, which has a screw by which it may be attached to the article. Fig. 5 is a vertical section of a modified form of caster, and Fig. 6 a plan view of one of the journal-bearing parts of the bearing-block.

The base-plate $a$, of circular or other suitable shape, has a screw $a'$ cast into it or otherwise secured to it. The roller $b$ is formed with journals $b'$ at each side like unto trunnions, and said roller, with its journals, may be constructed in any desirable way. The bearing-block for said roller $b$ is herein shown as composed of several separable parts, there being two essential parts, herein shown as $c\ c$, one as a bearing for each journal, and said journal-bearing parts are made alike, and they are surmounted by a cap $e$. Each part $c$ has formed upon its inside a recess $c'$ of suitable shape and size to receive a set of balls $c^2$, surrounding the journal $b'$ of the roller, thereby providing an antifriction-bearing for said journal. The two parts $c\ c$ of the bearing-block are formed at their upper ends with a circular shoulder, and the cap $e$ is shaped and adapted to fit upon said shouldered end of the block and thus hold the two parts together.

The bearing-block when thus assembled is connected with the base-plate $a$ in such a manner as to be securely retained, yet free to rotate with relation thereto, and in carrying out this part of my invention I preferably employ for simplicity a ferrule $d$, having a more or less contracted lower end, which receives and more or less surrounds and incloses the separable bearing-block and the roller supported by it, and said ferrule, with the parts thus contained within it, is driven onto the base-plate $a$, or it may be otherwise secured to it. The bearing-block and roller supported by it are thus securely held in place. In order that said bearing-block may be perfectly free to rotate even when the caster is supporting a heavy weight, I provide the adjacent faces of said bearing-block and base-plate each with a groove and in said grooves place a set of balls, which serve as antifriction-bearings for the block. As shown in Fig. 1, the cap $e$, which forms a cooperative part of the bearing-block, will be grooved. The bearing-block thus described is composed of three pieces $c$, $c$, and $e$, but by referring to Fig. 5 a bearing-block is shown composed of two journal-bearing pieces, as $c\ c$, the cap $e$ being omitted, and in this case the groove for the balls at the under side of the base-plate will be formed in the top of said parts $c\ c$, as shown in Fig. 6. Thus I desire it to be understood that the bearing-block may be composed of any number of pieces desired. It will be seen that the said set of balls beneath the base-plate, in addition to affording an antifriction-bearing, serves as a key to assist in holding the parts of the bearing-block when made in two pieces assembled, and thus prevented from spreading, as would be the case if a key or some equivalent element at such point were not provided.

It is obvious that the journals of the roller may be made as long as desired and even extend through the parts of the separable bearing-block and also that the separable bearing-block may be connected with the base-plate in any desirable way and yet come within the spirit and scope of this invention.

I claim—

1. In a caster, the roller $b$ having journals $b'$, the bearing-block therefor having recesses for said journals, the base-plate $a$ adapted to be secured to an article, and ferrule $d$ loosely embracing and supporting said bearing-block and secured to said base-plate, substantially as described.

2. In a caster, a roller having journals, a bearing-block, a base-plate, grooves formed in the adjacent faces of said bearing-block and base-plate and a set of balls contained therein, and a ferrule for holding said parts assembled, substantially as described.

3. In a caster, a roller having journals, a separable bearing-block the parts of which are formed with recesses, balls contained therein surrounding the journals of the roller, a base-plate and a ferrule for holding the parts of said bearing-block assembled and connecting them with the base-plate, substantially as described.

In testimony whereof I have signed my name to this specification in the presence of two subscribing witnesses.

DAVID HUNT.

Witnesses:
B. J. NOYES,
L. M. GARBUTT.